United States Patent

McKenney, Jr. et al.

[15] 3,673,101
[45] June 27, 1972

[54] PROCESS FOR PREPARING IMPROVED CARBIDE MICROSPHERES FROM ION EXCHANGE RESINS

[72] Inventors: Robert Lee McKenney, Jr., Silver Spring; Jacob Block, Rockville, both of Md.

[73] Assignee: W. R. Grace & Co., New York, N.Y.

[22] Filed: Dec. 8, 1969

[21] Appl. No.: 883,298

[52] U.S. Cl. ...................252/301.1 R, 23/208, 23/349, 264/0.5
[51] Int. Cl. ...................................................C09k 3/00
[58] Field of Search..................252/301.1; 264/0.5; 23/349, 23/208

[56] References Cited

UNITED STATES PATENTS 3,403,008   9/1968   Hamling .................................23/344
3,334,050   8/1967   Grotenhuis et al. ................252/301.1

OTHER PUBLICATIONS

Gilbert, Sulfonation and Related Reactions, John Wiley & Sons, 1965, pp. 437–438
Polyauskii, Chem. Abstracts, Vol. 58, Abstract No. 5,837, 1963

*Primary Examiner*—Carl D. Quarforth
*Assistant Examiner*—R. L. Tate
*Attorney*—Joseph P. Nigon and Kenneth E. Prince

[57] ABSTRACT

A process for controlling the amount of sulfur in metal carbide plus carbon microspheres made from ion exchange resins in which the microspheres are desulfurized by heating under hydrogen, hydrogen plus water or carbon monoxide plus water, at temperatures of 500–900° C. for times of 3 to 25 hours.

4 Claims, No Drawings

PROCESS FOR PREPARING IMPROVED CARBIDE MICROSPHERES FROM ION EXCHANGE RESINS

U.S. application Ser. No. 831,710, filed June 9, 1969, describes a process of the formation of metal carbide and metal carbide plus carbon microspheres by the controlled decomposition of ion exchange resin beads that contain metals followed by conversion to the metal carbide or metal carbide plus carbon.

The process disclosed covers the preparation of these microspheres from two different types of resins. One of these types, the cation exchange resins, have exchange activities associated with aromatic sulfonic, ethylene sulfonic, carboxylic acid, phosphonic acid, and phenolic groups. One of the most common of these resins is prepared by the sulfonation of synthetic organic base materials.

A high capacity aromatic sulfonic acid cation resin is prepared commercially by sulfonation of a polymer prepared from a mixture of styrene and divinyl benzene with sulfuric acid. The preparation of these resins is described in detail in the literature.

Broadly speaking, the process described in the above application comprises loading the exchange functionality of the spherical ion exchange resins with metal ions. The metal loaded resins are then dried and thermally decomposed to give metal carbide plus carbon microspheres. The amount of metal exchanged into the resin microsphere is the main determining factor in the composition of the final product. The amount of exchange can be controlled up to the maximum capacity of the resin by controlling the amount of metal ion in the solution in contact with the resin. The final step in the preparation is the thermal decomposition of the resin microspheres to give a reproducible carbon loss.

This application describes a process in which solutions of the metal ions such as titanium, zirconium, hafnium, molybdenum, plutonium, uranium, thorium, osmium, and thallium are contacted with the resin. The only limitation on the choice of the metal is that its salts be somewhat soluble and ionizable. The chlorides, nitrates, and sulfates of these metals can be readily dissolved and exchanged.

One of the problems encountered in the preparation of these microspheres from the sulfonic acid type resin beads was the removal of sulfur from the final product. The product was desulfurized in the step of the process in which the exchanged resin was converted to the carbide. In a typical run described in the above-identified application, the resin was dried at 100° C. and the spheres heated slowly in argon to a temperature of 1,500° C. Heating for 1 hour at 300° C. followed by one hour at 500° C. and then long periods, on the order of about 15-28 hours, at 1,500° C. is typical.

The amount of sulfur in the product is reduced during this conversion step. In the process described above, the sulfur was decreased from about 11.0 weight percent to about 3.2 weight percent by heating the spheres at 600°-1,300° C. The conversion to the carbides is carried out in an atmosphere of an inert gas such as argon or in a vacuum. For obvious reasons, a sulfur content of 3.2 percent is undesirable.

We have found that microspheres prepared from sulfonic acid type resins can be effectively desulfurized by heating the resin beads in hydrogen, hydrogen plus water, or carbon monoxide plus water. The desulfurization is carried out by heating at temperatures of 500°-900° C. for periods of 3 to 25 hours and is normally carried out in conjunction with the step in which the metal loaded microspheres are converted to carbide plus carbon. By using our novel process, it is possible to reduce the sulfur content of the carbide plus carbon microspheres to less than 0.1 percent sulfur.

The maximum weight of metal that theoretically can be exchanged into the resin depends, of course, on the metal ion species. For instance, titanium can be exchanged to a theoretical maximum of 12.8 weight percent with uranium the theoretical maximum is 33.8 weight percent. Theoretical values are based on a divalent metal ion species. In fact though, more metal can be exchanged into the resin than theoretical.

Although satisfactory results are obtained when the microspheres are heated in atmospheres of hydrogen, hydrogen and water or carbon monoxide and water, best results are obtained when the heating is carried out in an atmosphere of hydrogen and water.

The desulfurization is carried out in a conventional furnace equipped with a gas inlet and a gas outlet. The flow rate to the furnace varies depending on the gas being used. When the gas is a mixture of hydrogen and water, for example, the hydrogen flow rate is conveniently held between 1 and 8 liters per minute. The water flow rate must be such that the water flow rate to sample weight ratio (moles/g, hour) is equal to or greater than 0.02 to about 0.1. The preferred hydrogen flow rate is about 2.5 to 3.5 liters per minute for static bed samples and 2.5 to 10 liters per minute for fluid bed samples. Satisfactory results are obtained when the product is heated to temperatures of 500°-900° C. with temperatures of 700°-800° C. being preferred. The heating is carried out for periods of from 3-25 hours. Satisfactory results are achieved in most cases on heating from 5 to 8 hours. Large samples, 100 to 300 grams, require times as long as 12 hours.

Our invention is further illustrated by the following specific but non-limiting examples.

EXAMPLE 1

This example illustrates the general method of preparing the carbide plus carbon spheres.

A total of 50 pounds of an aromatic sulfonic acid type cation exchange resin (Dowex 50WX4) in the 100-200 mesh size range and in the hydrogen form, was suspended in 16.8 liters of deionized water. A total of 2423 grams of hafnyl chloride ($HfOCl_2 \cdot 8H_2O$) was added. The mixture was stirred for 24 hours. The resin was filtered and washed free of chloride with deionized water and vacuum dried at 100° C. Several samples, approximately 2 grams each, were heated in argon at various temperatures for varying periods of time, generally about 1 hour. Decomposition to the carbides was monitored by weight loss. The maximum weight loss (about 30-35 percent) occurred above 900° C. The resulting hafnium carbide plus carbon microspheres decreased in size from 100 micron resin spheres to about 80 micron spheres. The resin beads charred with essentially no agglomeration or deterioration of the surface or shape of the beads. The density of the material, when sintered at 1,200° C., was 2.4 grams per cubic centimeter.

EXAMPLE 2

This example illustrates the preparation of zirconium exchanged resin microspheres.

2,055 g. of $ZrOCl_2 \cdot 8H_2O$ was dissolved in 5 liters of water. 9.6 kg of acid washed Dowex 50WX4 resin was added to 20 liters of water. The zirconium solution was added to the resin water mixture, and additional water was added to make a total volume of 28 liters of water. The mixture was stirred for 18 hours, then filtered, washed with water and dried at 160° C. The dried resin contained 15.54% Zr (as $ZrO_2$) and 44.10 percent carbon.

EXAMPLE 3

This example illustrates the preparation of titanium exchanged resin microspheres.

Sixty-six grams of a sulfonic acid ion-exchange resin (Amberlite IR 120) in the hydrogen form in the 30-50 mesh size range was washed three times with dilute hydrochloric acid, three times with water, and once with water adjusted to a pH of 0.7 with hydrochloric acid. A titanium solution was prepared by adding 3.0-3.5 ml of $TiCl_4$ dropwise with stirring to 1 liter of cold dilute hydrochloric acid solution (pH 0.8-1.0). The resin and the solution were then stirred for several hours. The solution was then decanted, and a fresh solution prepared as described above was added. This was repeated for 6 additional times or until no more titanium was taken up by the resin as determined by residue analysis on small samples. The resin was then filtered and washed with deionized water. The resin was dried at 105° C. and found to contain 39.6 percent carbon and 18.9 percent titanium (as $TiO_2$).

EXAMPLE 4

This is another example illustrating the preparation of titanium exchanged resin microspheres.

To 1,790 grams of acid washed Dowex 50W–X4 resin, 200–400 mesh, H+ form, 65.8% $H_2O$, was added 8.1 liters of deionized water. Then 500 ml. of $TiCl_4$ was added dropwise with vigorous stirring to the resin-water mixture. The mixture was stirred for 24 hours, then the resin was filtered off, washed free of chloride, and dried at 145° C. Analysis of the resin showed a $TiO_2$ content of 21.82 percent and carbon content of 39.14 percent.

EXAMPLE 5

This example illustrates the preparation of uranium exchanged resin microspheres.

In this run, 100 grams of sulfonic acid ion exchange resin in the hydrogen form (Dowex 50W–X4), 200–400 mesh size range, was rinsed three times with dilute hydrochloric acid. A solution was made up by dissolving 37 grams of $UO_2(NO_3)_2 \cdot 6H_2O$ in a liter of water. The mixture was stirred for 22 hours and an additional 3.5 grams of $UO_2(NO_3)_2 \cdot 6H_2O$ were added. The mixture was stirred for two additional hours. The resin spheres were then filtered and washed with deionized water. The pH of the solution dropped from 2.05 to 0.75. The spheres were dried and analyzed and found to contain 33 percent carbon and 24.7 percent uranium (as U).

EXAMPLE 6

This example illustrates the desulfurization of a sulfonic acid type cation exchange resin using a mixture of hydrogen and water vapor in the furnace.

Four samples of resin beads of the aromatic sulfonic (styrene base) cation exchange resins (Ionac CGC 243) each containing a different amount of hafnium exchanged into the resin using the general process described in Example 1 were heated in hydrogen saturated with water vapor. The hydrogen flow rate was 3 liters per minute and the water flow rate was approximately 0.16 moles per hour. The resins were heated to 700° C. over a period of 1 hour and kept at 700° C. for various periods of time. The results are tabulated below:

TABLE 1

| Run No. | Initial conc. in percent | | | Initial carbon to metal ratio | Final conc. in percent | | Final carbon to metal ratio |
|---|---|---|---|---|---|---|---|
| | Sulfur | Hafnium | Carbon | | Sulfur | Hafnium | |
| 1 | 9.99 | 34.6 | 30.1 | 15.2 | 0.11 | 50.3 | 10.0 |
| 2 | 10.68 | 27.9 | 33.9 | 18.5 | 0.10 | 43.5 | 14.2 |
| 3 | 12.73 | 19.8 | 38.3 | 29.6 | 0.19 | 23.1 | 33.8 |
| 4 | 14.17 | 13.4 | 42.6 | 47.6 | 0.10 | 37.6 | 25.3 |

It is apparent from these data that the optimum results are obtained on heating for 6 hours. It has been found that heating for less than 6 hours leaves appreciable amounts of sulfur and longer heating times do not decrease the sulfur significantly. The sulfur content was well below 0.2 percent in all cases.

EXAMPLE 7

A series of runs were completed in which the results of heating the spheres to 700° C. in various gases was investigated. The spheres were prepared according to the method of Example I and had an initial carbon to metal ratio of 18.4. The results obtained when these spheres were heated in argon, hydrogen, and a mixture of carbon monoxide and water, is set out in the table below:

TABLE III

| Gas | Flow rate | Time at 700°C. in hours | Percent sulfur initial | Percent sulfur final | Carbon to metal ratio |
|---|---|---|---|---|---|
| Argon | 1.6 liters/min. | 24 | 11.6 | 11.1 | 17.9 |
| Hydrogen | 3 liters/min. | 6.3 | 11.6 | 2.36 | 15.0 |
| $CO+H_2O$ | CO-0.6 liters/min. $H_2O$-0.039 moles/hour | 25 | 11.6 | 4.90 | 17.6 |

Best results were obtained when the spheres were heated to 700° C. in a hydrogen atmosphere. The sulfur was reduced from 11.6 to 2.36 percent in this run. Heating the spheres in argon to a temperature of 700° C. even for a protracted period of time, did not result in appreciable desulfurization.

What is claimed is:

1. A process for preparing metal carbide plus carbon microspheres having a sulfur content of less than 0.2 weight percent by the controlled decomposition of sulfonic acid cation exchange resin spheres which comprises the steps of:
   a. Contacting the spheres with a solution of a metal salt selected from the group consisting of the nitrates, chloride, and sulfates of zirconium, molybdenum, titanium, osmium, hafnium, thallium, plutonium, thorium and uranium, until the desired loading is achieved.
   b. Drying said spheres,
   c. Heating said spheres in an atmosphere of hydrogen, hydrogen and water, or carbon monoxide and water to a temperature of 500° to 900° C.,
   d. Heating the spheres in an inert atmosphere or in a vacuum to convert the metal to the carbide, and
   e. Recovering the product metal carbide plus carbon microspheres.

2. The process according to claim 1 wherein the spheres containing from about 5 to 40 weight percent metal ion are heated, in step (c), in an atmosphere of hydrogen and steam for a period of 3 to 25 hours.

3. The process according to claim 1 wherein the resin spheres are contacted with an aqueous hafnyl chloride solution, dried and heated to about 600°–700° C. in an atmosphere of hydrogen and water for a period of about 5 to 7 hours.

4. The process according to claim 1 wherein the dried spheres are contacted in a furnace with a stream of hydrogen and water in which the hydrogen is fed at a rate of 1 to 8 liters per minute and the water at a rate of 0.02 to 0.1 moles per gram of resin per hour.

* * * * *